(12) United States Patent
Tada et al.

(10) Patent No.: US 7,184,707 B2
(45) Date of Patent: Feb. 27, 2007

(54) COMMUNICATION DEVICE AND A METHOD FOR CONTROLLING THE COMMUNICATION DEVICE

(75) Inventors: Masahiro Tada, Tokyo (JP); Ikuo Sako, Tokyo (JP); Koichi Yata, Saitama-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 663 days.

(21) Appl. No.: 10/084,502

(22) Filed: Feb. 28, 2002

(65) Prior Publication Data

US 2002/0147003 A1 Oct. 10, 2002

Related U.S. Application Data

(63) Continuation of application No. PCT/JP01/05570, filed on Jun. 28, 2001.

(30) Foreign Application Priority Data

Jul. 6, 2000 (JP) ............................. 2000-204623

(51) Int. Cl.
*H04B 7/00* (2006.01)
*H04Q 7/20* (2006.01)
*H04J 3/16* (2006.01)

(52) U.S. Cl. ............... 455/41.3; 455/455; 455/510; 455/513; 370/466

(58) Field of Classification Search ............... 455/41.2, 455/41.3, 450; 358/1.5
See application file for complete search history.

(56) References Cited

U.S. PATENT DOCUMENTS 5,287,545 A * 2/1994 Kallin ..................... 455/510

6,633,757 B1 * 10/2003 Hermann et al. ........ 455/414.1
6,721,787 B1 * 4/2004 Hiscock ...................... 709/217
6,807,413 B1 * 10/2004 Honda .................... 455/414.1
6,965,948 B1 * 11/2005 Eneborg et al. ............. 709/250
7,010,323 B2 * 3/2006 Suwa ...................... 455/552.1
7,024,183 B2 * 4/2006 Hymel ....................... 455/417

(Continued)

FOREIGN PATENT DOCUMENTS

JP 10-322773 12/1998

(Continued)

OTHER PUBLICATIONS

Copy of International Search Report dated Sep. 25, 2001.

*Primary Examiner*—Fan Tsang
*Assistant Examiner*—Lisa Hashem
(74) *Attorney, Agent, or Firm*—Finnegan, Henderson, Farabow, Garrett & Dunner, L.L.P.

(57) ABSTRACT

A communication device and a method for controlling a communication device that can load or unload service information at appropriate timings by flexibly designating discriminating conditions of connection or disconnection of a link. A service manager reads out necessary service information, such as service program or driver software, from the information memory area based on discriminating conditions designated in communication controlling information of the communication status. The service manager loads service information to a temporary information memory area in a host device. The service manager also unloads unnecessary service information from the temporary information memory area in the host device. A connection manager then performs communication protocol for communicating between the service information loaded in the temporary information memory area of the host and the service information memory of the device side.

5 Claims, 11 Drawing Sheets

U.S. PATENT DOCUMENTS

| | | | |
|---|---|---|---|
| 2002/0034192 A1* | 3/2002 | Kim | 370/466 |
| 2002/0051184 A1* | 5/2002 | Fritz et al. | 358/1.15 |
| 2002/0094778 A1* | 7/2002 | Cannon et al. | 455/41 |
| 2002/0111138 A1* | 8/2002 | Park | 455/41 |
| 2003/0078002 A1* | 4/2003 | Sanjeev et al. | 455/41 |

FOREIGN PATENT DOCUMENTS

| | | |
|---|---|---|
| JP | 11-164359 | 6/1999 |
| JP | 11225364 A | 8/1999 |
| JP | 11-355279 | 12/1999 |
| JP | 2000115189 A | 4/2000 |
| WO | WO 97/40457 | 10/1997 |

* cited by examiner

FIG. 11

| DEVICE ADDRESS | FRIENDLY NAME | CONNECTION JUDGING CONDITIONS ||||  DISCONNECTION JUDGING CONDITIONS ||||
|---|---|---|---|---|---|---|---|---|
| | | ISSUE NUMBER-OF-TIMES OF INQUIRY (n) | INTERVAL (TI) | DETECTION NUMBER-OF-TIMES MAINTENANCE TIME (Tn) | DETECTION MODE | ISSUE NUMBER-OF-TIMES OF CONNECTION REQUEST (m) | INTERVAL (Tj) | DETECTION NUMBER-OF-TIMES MAINTENANCE TIME (Tm) | DETECTION MODE |
| A A A A | TERMINAL A | | | | | | | | |
| B B B B | TERMINAL B | | | | | | | | |
| C C C C | TERMINAL C | | | | | | | | |
| X X X X | SETUP DEFAULT | | | | | | | | |
| | | | | | | | | | |

FIG. 12

| CONDITION SETUP OBJECT : | TERMINAL C ▼ | | |
|---|---|---|---|

CONNECTION DETECTING CONDITIONS SETUP ITEMS
- INQUIRY ISSUE NUMBER OF TIMES [ ] NUMBER-OF-TIMES
- INTERVAL [ ] ms
- DETECTION NUMBER MAINTENANCE TIME [ ] ms

INQUIRY DETECTION MODE ⋯ ◉ FIXED ○ VARIABLE

DISCONNECTION DETECTING CONDITIONS SETUP ITEMS
- CONNECTION REQUEST ISSUE NUMBER-OF-TIMES [ ] NUMBER-OF-TIMES
- INTERVAL [ ] ms
- DETECTION NUMBER MAINTENANCE TIME [ ] ms

CONNECTION REQUEST DETECTION MODE ⋯ ◉ FIXED ○ VARIABLE

[ REGISTER ]  [ CANCEL ]

COMMUNICATION DEVICE AND A METHOD FOR CONTROLLING THE COMMUNICATION DEVICE

CROSS REFERENCE TO RELATED APPLICATIONS

This application is a continuation of international application number PCT/JP01/05570, filed Jun. 28, 2001, and claims priority to Japanese Patent Application No. 2000-204623, filed Jul. 6, 2000, the contents of which are incorporated herein by reference.

This application claims the benefit of priority of International Application No. PCT/JP01/05370, filed on Jun. 28, 2001.

TECHNICAL FIELD OF THE INVENTION

The present invention relates to a communication device and a method for controlling the communication device, and more particularly to a radio communication device and a method for control thereof.

DESCRIPTION OF RELATED ART

In the case where peripheral devices or extension cards are connected to a personal computer (PC), the PC is loaded with suitable driver software for the respective devices so that it may recognize hardware information for the additional devices. Moreover, the PC may further allocate various resources such as an I/O port, by using plug and play technology. In plug and play technology, the driver software corresponding to the additional devices and other related service programs are loaded or unloaded. The PC determines whether to load or unload the device software and source programs by detecting the device connection to the PC through a direct bus connection or a cable wired connection.

Recently, radio communication techniques have been put to practical use in coupling information devices. Radio communication techniques such as "Bluetooth" or Home RF are being used in coupling, for example, a PC and a Personal Digital Assistance (PDA); or a PC and a mobile telephone.

Bluetooth is a radio communication interface standard that uses an Industrial Scientific Medical (ISM) band of 2.4 GHz as a carrier frequency and provides a band zone of 1 Mbps within a 10 m service area.

Similar to Bluetooth, Home RF is also a radio communication standard for a home application. Home RF uses the same ISM band of 2.4 GHz as a carrier frequency and communicates through a maximum data transmission speed of 1.6 Mbps in a service area covering a distance from 50 m to 100 m.

In the prior art radio communication systems discussed above, a connection or disconnection between a master device and a slave device may frequently occur when the radio state becomes unstable due to the surrounding environment. During each connection or disconnection, a host PC may experience an increase in loads because of the repetitious loading and unloading, for example, of service information such as driver software or service programs. The increased load on the host PC results in a number of problems that hinder performance. Unintended communications generated by a user of the host PC due to the unexpected loading of service information, for example, causes excessive loads on the communication operations of the host PC. Further, unintended unloading of service information by a user may prevent the host PC from communicating service information to the peripheral device.

Japanese patent application publication No. 11-355279, discloses technology that controls data communication in a radio communication system based on a corresponding link status of the radio communication system. The link status is determined by monitoring data communication between two devices of the radio communication system. Based on the number of frames corresponding to decoded managing data, the disclosed technology determines whether the communication environment is an all data transmittable area, an asynchronous transmittable area, or a transmission unable area. Identifying the type of communication environment enables the host PC to determine whether the radio communication system has a link possible status, a link impossible status, or a link possible status for only asynchronous data that are performed during a retransmission process.

A host device in a conventional radio communication system experiences reduced performance in its communication processes because of the repeated loading and unloading of service information, which corresponds to a radio link state of the radio communication system. The technology disclosed in Japanese patent application publication No. 11-355279 may increase the reliability of data communication. However, this technology cannot resolve the problem of reduced communication performance attributed to the unintentional loading or unloading of service information.

To overcome the above and other disadvantages of the prior art, methods and systems consistent with the present invention control a communication device to load or unload service information at appropriate timings by flexibly designating discriminating conditions on a link connection or a link disconnection in order to secure a stable radio communication system.

SUMMARY OF THE INVENTION

An embodiment consistent with the present invention relates to a radio communication device on a network for communicating with a target communication terminal on the network. The radio communication device comprises a memory for storing service information so that perform predetermined functions can be performed over the network with the target communication terminal; a judging module for judging whether predetermined connection conditions with the target communication terminal are satisfied by repeating a target communication terminal discovery process before establishing radio communications with another target communication terminal; and a communication control module for executing the predetermined functions with the target communication terminal by reading service information associated with the target communication terminal from the service information memory when the predetermined connection conditions are satisfied.

Another embodiment consistent with the present invention also relates to a radio communication device on a network for communicating with a target communication terminal on the network. The radio communication device comprises a service information memory for storing service information that corresponds to the target communication terminal so that predetermined functions can be performed with the target communication terminal over the network; a judging module for judging whether predetermined disconnection discriminating conditions are satisfied by repeating a connection process with the target communication terminal before disconnecting radio communication with the target communication terminal; and a communication control module for invalidating the predetermined functions associated with the service information that corresponds to the target communication terminal and storing the service information in the service information memory mechanism when the predetermined disconnection discriminating conditions are satisfied.

A further embodiment consistent with the present invention relates to a radio communication device in a network for communicating with a target communication terminal in the network. The radio communication device comprises a service information memory for storing service information so that predetermined functions can be performed with the target communication terminal; and a communication control module for communicating with the target communication terminal by using the service information read out from the service information memory based on communication controlling information that defines discriminating conditions for establishing a new connection with the target communication terminal or disconnecting an existing connection with the target communication terminal.

An additional embodiment consistent with the present invention relates to a communication device comprising a radio communication module for exchanging data with a target communication terminal over a network; a service information memory for storing service information so that predetermined functions can be performed with the target communication terminal; a communication control information designating module for designating communication conditions for a newly established radio communication connection with the target communication terminal or for discriminating a disconnection of an existing radio communication connection with the target communication terminal; a memory for storing the designated communication controlling information by the communication control information designating module; and a communication control module for determining whether the radio communication connection with the target communication terminal is in a connection status or a disconnection status based on the communication controlling information stored in the memory, and performing communication through the radio communication module by using service information read from the service information memory in accordance with the determination result.

Yet another embodiment consistent with the present invention relates to a radio communication device in a network that exchanges service information with a target communication terminal in the network for performing predetermined functions. The radio communication device comprises a service memory for storing the service information; a temporary memory for temporarily storing the service information used to establish communications with the target communication terminal; a first module for transferring the service information from the service memory to the temporary memory when a radio communicating connection for the target communication terminal has been established, and for transferring the service information from the temporary memory to the service memory when the radio communication connection with target communication terminal has been disconnected based on communication controlling information used for discriminating between a newly established radio communication connection with the target communication terminal and a disconnection of an existing radio communication connection with the target communication terminal; and a radio communication control mechanism for performing the predetermined functions with the target communication terminal when the service information is stored in temporary memory.

Yet a further embodiment consistent with the present invention relates to a communication device comprising a radio communication module for exchanging data with a target communication terminal through radio; a service memory for storing service information so that predetermined functions can be performed with the target communication terminal; a temporary memory for temporarily storing service information used in an established target communication terminal for communication; a designating module for designating communication controlling information in order to define conditions for discriminating between a newly established radio communication connection with the target communication terminal or a disconnection of an existing radio communication connection with the target communication terminal; a communication controlling information memory for storing the communication controlling information designated by the designating module; a memory for storing the communication controlling information designated by the designating module; a discriminating module for determining whether a status of the radio communication connection with a target communication terminal is a connection status or a disconnection status based on the communication controlling information in the communication controlling information memory, and transferring the service information from the service memory to the temporary memory when the status of the radio communication connection with the target communication terminal is the connection status, and transferring the service information from the temporary memory to the service memory when the status of the radio communication connection with the target communication terminal is the disconnection status; and a radio communication control module for performing the predetermined functions with the target communication terminal when the service information is stored in the temporary memory.

Yet an additional embodiment consistent with the present invention relates to a method for controlling a communication device that exchanges data with a target communication terminal over a radio network. The communication device has a memory for storing various types of data. The method when establishing a new radio communication connection between the communication device and a target communication terminal, comprises judging whether predetermined connection discriminating conditions are satisfied by repeating a target communication terminal discovery process before performing the predetermined functions; and performing the predetermined functions through the radio communication connection by extracting required service information from memory to perform the predetermined functions between the communication device and the target communication terminal, the required service information is stored in the memory by executing the predetermined functions with the target communication when the predetermined connection conditions are satisfied.

Still another embodiment consistent with the present invention relates to a method for controlling a communication device that exchanges data with a target communication terminal over a network. The communication device has a memory for storing various types of data. The method when disconnecting radio communication connection established between the communication device and a target communication terminal, comprises judging whether disconnection conditions are satisfied by repeating a target communication terminal connection process; and invalidating the predetermined functions corresponding to executed service information that is stored in memory so that the predetermined functions between the communication device and the target communication terminal can be performed when the disconnection discriminating conditions are satisfied.

Still a further embodiment consistent with the present invention relates to a method for controlling a communication device that exchanges data with target communication terminal over a network, the communication device having a memory mechanism for storing various types of data. The method comprises judging whether a radio communication connection between the communication device and a target communication terminal is in a connection status or in a disconnection status, based on communication controlling information that defines conditions for discriminating between a new radio communication connection established between the communication device and a new target communication terminal, or a disconnection of radio communication connection established between the communication device and the target communication terminal, and performing radio communications with the target communication terminal by using service information that executes the predetermined functions between the communication device and the target communication terminal, the service information being stored in memory based on a discrimination result.

Still an additional embodiment consistent with the present invention relates to a method for controlling a communication device that exchanges data with a target communication terminal over a network, the communication device having a memory for storing various types of data. The method comprises storing, in memory, designated communication control information that defines discriminating conditions for discriminating between establishing a new radio communication connection between the communication device and a target communication terminal, or a disconnecting a radio communication connection established between the communication device and the target communication terminal; judging whether the radio communication connection between the communication device and the target communication terminal is in a connection state or a disconnection state based on the designated communication control information; and performing radio communication with the target communication terminal by using service information that executes the predetermined functions between the communication device and the target communication terminal, the service information being stored in memory based on a discrimination result.

BRIEF DESCRIPTION OF THE DRAWINGS

FIG. 11 illustrates an example of a connection/disconnection setup state of a radio link consistent with the present invention.

FIG. 12 illustrates an example of user interface screen for designating connection/disconnection conditions for a radio link consistent with the present invention.

DETAILED DESCRIPTION OF THE EMBODIMENTS

Reference will now be made in detail to exemplary embodiments of the invention, which are illustrated in the accompanying drawings. Wherever possible, the same reference numbers will be used throughout the drawings to refer to the same or like parts.

Figure 1:
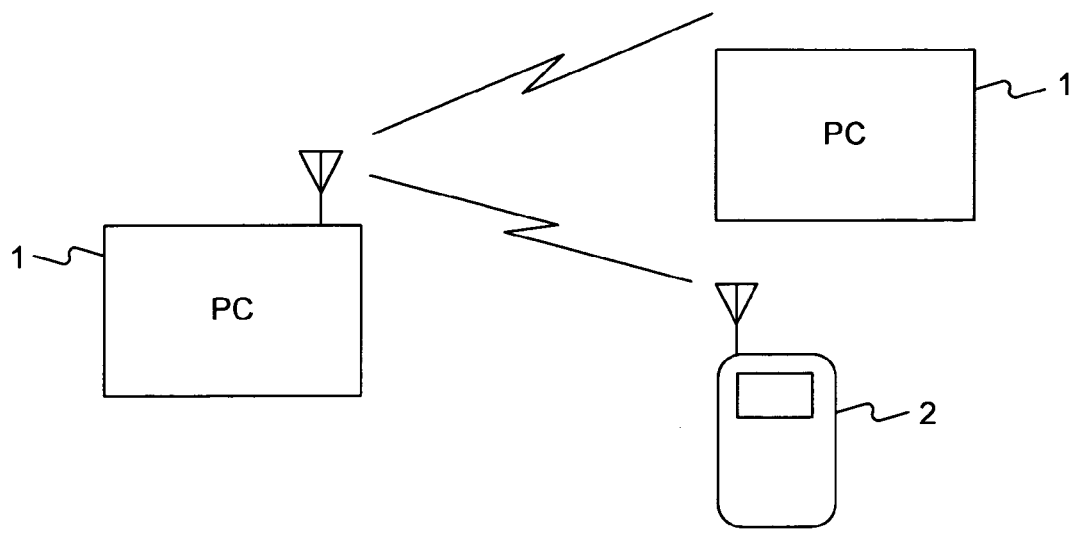
FIG. 1 is a block diagram illustrating a general structure of a radio-communications system consistent with the present invention.

FIG. 1 illustrates a basic structure of a radio-communication network 100 in accordance with an embodiment of the present invention invention. Generally, the radio communication system comprises information process equipment and a mobile apparatus. The information processing equipment may be represented, for example, by a battery driven notebook type personal computer (PC 1). The mobile apparatus may be represented by a mobile telephone 2. PC 1 and mobile telephone 2 may communicate information by establishing a local radio link. When a radio link is established between PC 1 and mobile telephone 2, a user may perform predetermined service programs on radio communication network 100, such as mailing data or exchanging personal information.

PC 1 may establish a radio link between a plurality of devices on radio communication network 100 at the same time. For example, PC 1 may exploit a multi-point access technique by connecting to mobile telephone 2 and at least one other PC device of network 100. In the multi-point access technique, even if PC 1 is in a radio link state in which a connection has already been established, PC 1 may enter one of a number of operational modes. Particularly, PC 1 may enter a station discovery mode to search for a new target terminal, a waiting mode for the station discovery, or a waiting mode to demand an established connection to a discovered target terminal on the network. Thus, the multi-access technique enables a new target terminal to dynamically connect to network 100.

The station discovery mode enables PC 1 to search for a target terminal that is located in a communication range of PC 1, and collect information required for connection to the target terminal over network 100. In the station discovery mode PC 1 broadcasts a message that indicates a station discovery. The waiting mode for a station discovery enables PC 1 to detect a station discovery message transmitted from a target terminal for a station search. PC 1 transmits a message in response to the station discovery message of the target node. The waiting mode for demanding establishment of a connection enables PC 1 to detect a demand for connection establishment message transmitted from a target terminal. PC 1 performs a process in response to the demand for connection establishment message of the target terminal.

PC 1 executes one of the operational modes mentioned above to establish a new radio line to a target terminal on network 100. The station discovery mode, waiting for the station discovery mode, and waiting for a demand of connection establishment mode allow PC 1 to transfer messages over a control channel of network 100. However, when transmitting or receiving data, PC 1 uses a radio resource between the control channel and a communication channel. If PC 1 executes a control process while also communicating with a target device, PC 1 temporarily suspends the communication with the target device. PC 1 dynamically controls execution timings and intervals of control procedures based on conditions designated by a user. Particularly, PC 1 executes station discovery mode, waiting for the station discovery mode, and waiting for a demand of connection establishment mode for establishing a new radio link on network 100. PC 1 further executes the station connection demand mode to disconnect a radio link with a target device on the network.

Figure 2:
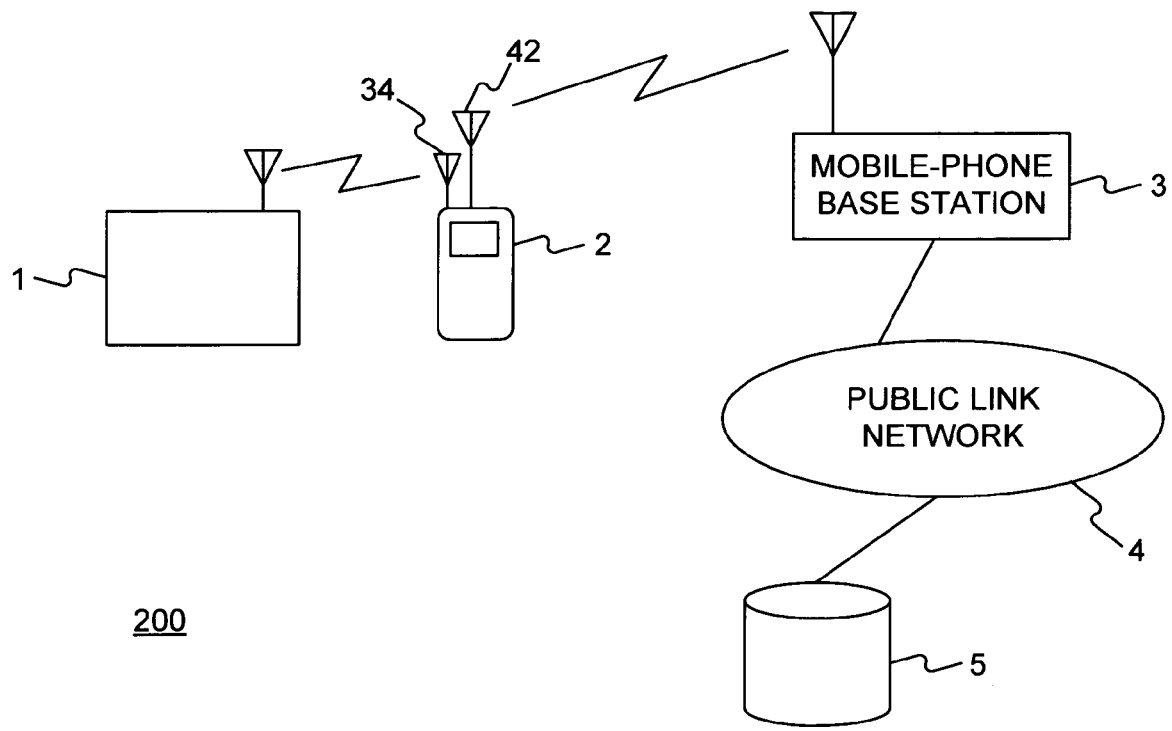
FIG. 2 is a block diagram illustrating a general structure of a complete radio-communications system consistent with the present invention.

FIG. 2 shows a general structure of a complete radio-communication network 200 in accordance with an embodiment consistent with the present invention. Radio communications network 200 includes PC 1, mobile telephone 2, a mobile phone base station 3, a public link network 4, and a server 5.

PC 1 includes an antenna unit 8 for communicating information with mobile telephone 2 over network 200. PC 1 further includes an LCD (not shown) for displaying data and a keyboard for inputting data (not shown).

Mobile telephone 2 includes a mobile phone antenna unit 42 for exchanging information with the mobile-phone base station 3 over an 800 MHz radio wave of network 200. Mobile telephone 2 further includes a radio antenna unit 34 for exchanging information with PC 1 over a 2.45 GHz radio wave. Mobile telephone 2 also includes a LCD (Liquid Crystal Display) for displaying data and a key operation unit for inputting data.

Mobile phone base station 3 represents a predetermined radio area and facilitates communications from a mobile telephone 2 located within the predetermined radio area. Public link network 4 connects mobile phone base station 3 to server 5.

Mobile telephone 2 performs transmission and reception of sound or data between mobile phone base station 3. Mobile phone base station 3 constitutes a predetermined radio area, and realizes communication with a portable telephone 2 within the radio area over the 800 MHz radio wave. Mobile phone base station 3 connects to server 5 through a public link network 4.

PC 1 and the mobile telephone 2 are coupled by a radio wave of a specific frequency band different from the radio wave used for communication in the mobile-phone system. Practically, the Bluetooth system of 2.45 GHz band is used for coupling between the PC 1 and the mobile telephone 2. The Bluetooth system is a short-distance radio-communications standard for realizing radio communications around 10 m by using an electric wave of 2.45 GHz band.

Figure 3:
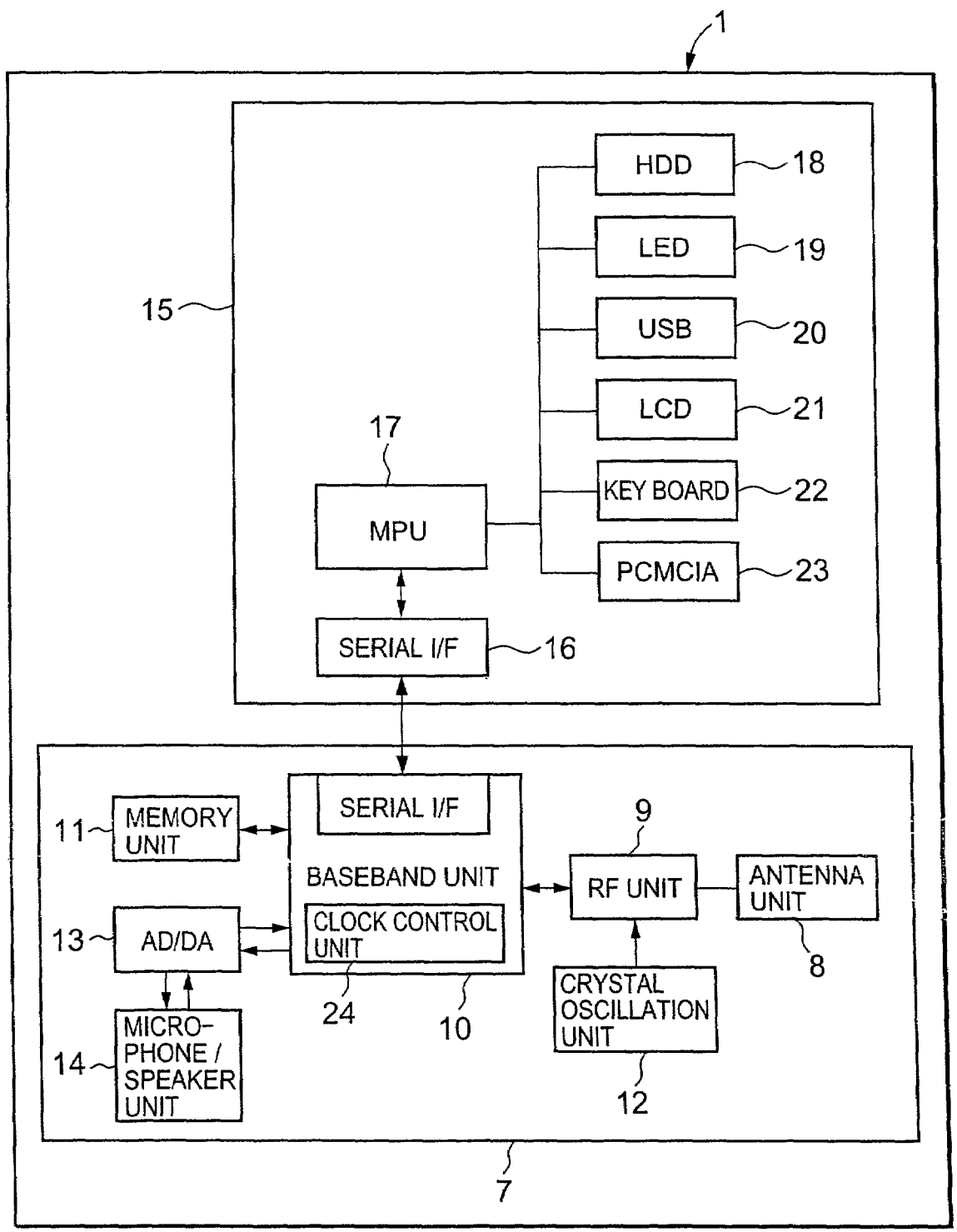
FIG. 3 is a block diagram illustrating a hardware structure of a personal computer used as information processing equipment consistent with the present invention.

FIG. 3 is a block diagram illustrating a hardware structure of PC 1 in accordance with an embodiment consistent with the present invention. PC 1 includes a radio module 7 having an antenna unit 8, a Radio Frequency (RF) unit 9, a base band unit 10, a memory unit 11, a crystal oscillation unit 12, an AD/DA conversion unit 13, and a microphone/speaker unit 14. PC 1 also includes an engine unit 15 having a Mathematical processing unit (MPU) 17, a hard disc drive (HDD) 18, a light emitting diode (LED) 19, a universal serial bus (USB) 20, a liquid crystal display (LCD) 21, a keyboard 22, and a personal computer memory card international association (PCMCIA) interface 23. Radio module 7 communicates data with mobile telephone 2 over the 2.45 GHz radio wave on network 200. Engine unit 15 provides an interface to users and other peripheral devices of network 200.

Antenna unit 8 provides an interface to radio communication network 200 and exchanges information with mobile telephone 2 over a 2.45 GHz radio wave. For illustrative purposes, antenna unit 8 is assumed to receive a signal over radio communication network 200.

When antenna unit 8 receives a 2.45 GHz radio wave, RF unit 9 is connected to receive the radio wave on its input from antenna unit 8. RF unit 9 is also connected to receive an input from crystal oscillation unit 12. RF unit 9 mixes the 2.45 GHz radio wave input from antenna unit 8 and a base frequency signal input from crystal oscillation unit 12 and produces an intermediate frequency signal. RF unit 9 decodes the intermediate frequency signal and generates a digital signal. RF unit 9 outputs the digital signal to an input of baseband unit 10. Alternatively, when antenna unit 8 transmits a 2.45 GHz radio wave, RF unit 9 is connected to receive an input from baseband unit 10 and an input from crystal oscillation unit 12. RF unit 9 modulates the signal received from baseband unit 10 with the base band signal received from crystal oscillation unit 12 to generate a 2.45 GHz radio wave. RF unit 9 provides the 2.45 GHz radio wave on its output to antenna 8.

When antenna unit 8 receives a 2.45 GHz radio wave, baseband unit 10 is connected to receive an input from RF unit 9. Baseband unit 10 includes a clock control unit 24 and a serial interface 16. Using clock control unit 24, baseband unit 10 changes the data sequences of the digital signals received on its input. Baseband unit 10 provides the modified digital signals to MPU 17 on serial interface 16. Alternatively, when antenna unit 8 transmits a 2.45 GHz radio wave, baseband unit 10 is connected to receive an input signal from MPU 17 over serial interface 16. Using clock control unit 24, baseband unit 10 converts the input signal to a form that can be processed by RF unit 9. Baseband unit 10 provides the converted signal on its output to RF unit 9.

Memory unit 11 is connected to receive an input signal from baseband unit 10. Memory unit 11 stores the received input signal. Alternatively, memory unit 11 may also provide the stored information on its output to baseband unit 10.

Microphone/speaker unit 14 receives or outputs audio information. When receiving audio information, microphone/speaker unit 14 is connected to provide the received audio signal on its output to AD/DA conversion unit 13. When outputting audio information, microphone/speaker unit 14 is connected to receive an audio signal on its input from AD/DA conversion unit 13. Microphone/speaker unit 14 then outputs the received audio signal.

MPU 17 includes among other things a central processing unit (CPU), a memory, and a peripheral control circuit. When antenna 8 receives a 2.45 GHz radio wave, MPU 17 is connected to receive an input from baseband unit 10 through serial interface 16 and provide an output to at least one of HDD 18, LED 19, USB 20, LCD 21, or PCMCIA 23. Alternatively, when antenna 8 transmits a 2.45 GHz radio wave, MPU 17 is connected to receive an input from one of HDD 18, USB 20, LCD 21, keyboard 22, or PCMCIA 23. MPU 17 then provides a signal to baseband unit 10 through serial interface 16. It should be apparent that MPU 17 may provide an output to at least one of HDD 18, LED 19, USB 20, LCD 21, or PCMCIA 23 regardless of a communication state of antenna 8.

When antenna 8 receives a 2.45 GHz radio wave over network 200, HDD 18 is connected to receive a signal from MPU 17. HDD 18 then stores the received signal. Alternatively, when antenna 8 transmits a 2.45 GHz radio wave over network 200, HDD 18 may provide a signal on its output to MPU 17.

LED 19 is connected to receive an input from MPU 17. LED 19 emits a visible colored light based on the input received from MPU 17. Particularly, LED 19 is used to indicate warnings regarding the operation of PC 1.

USB 20 is connected to receive an input from MPU 17. USB 20 connects peripheral devices (not shown) supporting the USB standard to PC 1. When directed by MPU 17, USB 20 provides signals on its output to the connected peripheral device. Alternatively, USB 20 is connected to receive an input from a connected peripheral device. USB 20 may provide signals on its input as an output to MPU 17.

LCD 21 is connected to receive an input signal from MPU 17. LCD 21 provides the input signal as an output so that information can be displayed to a user.

Keyboard 23 provides an interface between a user and PC 1. A user may input information onto keyboard 323 by depressing at least one of a plurality of keys (not shown). Keyboard 23 provides the signal generated by the depressed keys on its output to MPU 17.

PCMCIA 23 is connected to receive an input signal from MPU 17. PCMCIA 23 provides an interface for mounting a PC card. PCMCIA 23 provides the input signal on its output to the mounted PC card. Alternatively, PCMCIA 23 is connected to receive an input signal from a mounted PC card. PCMCIA 23 provides the input signal on its output to MPU 17.

Figure 4:
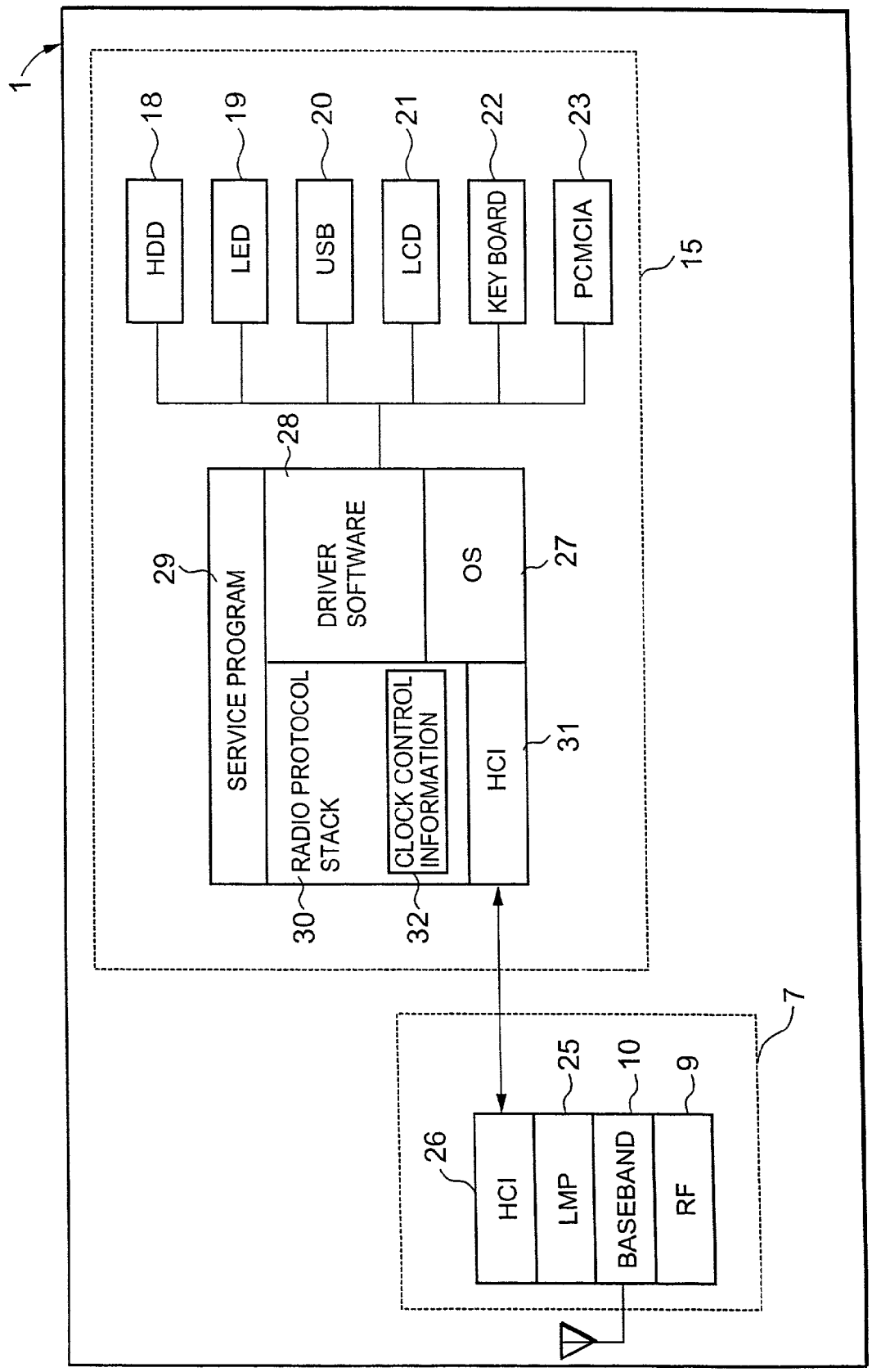
FIG. 4 is a block diagram illustrating a software structure of a personal computer consistent with the present invention.

FIG. 4 is a block diagram illustrating a software structure of PC 1 in accordance with the present invention. Because hardware components of PC 1 have been previously discussed, only the software components will be described below. PC 1 includes radio module 7 having RF unit 9, baseband unit 10, a Link Management Protocol (LMP) unit 25, and a Host Control Interface (HCI) 26. PC 1 also includes engine unit 15 having an operating system (OS) 27, driver software 28, a service program 29, a radio protocol stack 30, an HCI 31, and clock control information 32.

LMP 25 is configured to monitor an output of baseband unit 10. LMP 25 controls a radio link between PC 1 and other radio communication equipment of network 200, by analyzing information communicated over the 2.45 GHz radio wave. Through the analysis, LMP 25 determines whether a radio link between PC 1 and, for example, mobile telephone 2 exists. LMP 25 is further configured to provide results of this analysis to HCI 26.

HCI 26 is configured to receive an input from LMP 25. Alternatively, HCI 26 is also configured to provide an input received from the software components of engine unit 15 to LMP 25. HCI 26 provides a serial interface between the software components of engine unit 15 and LMP 25.

OS 27 is configured to provide an environment in which various software processes of engine unit 15 can be executed.

Driver software 28 is configured to control a number of peripheral hardware elements of engine unit 15, such as HDD 18, LED 19, USB 20, LCD 21, keyboard 22, and PCMCIA 23. Driver software 28 is further configured to control word-processing software, spreadsheet software, electronic mail software, and system software used for recognizing remote-control operations.

Service program 29 is configured to monitor or control specific functions or hardware components associated with engine unit 15.

Radio protocol stack 30 is configured to control communication over the 2.45 GHz frequency band by storing information received through HCI 31. Radio protocol stack 30 controls the flow of information between the service program 29 and driver software 28 mounted on engine unit 15 and LMP 25 mounted on radio module 7. Clock control information 32 is a sub-component of radio protocol stack 30 and is configured to control the timing of all processes input or output from the radio protocol stack 30.

HCI 31 is configured to receive an input from radio protocol stack 30. Alternatively, HCI 31 is also configured to provide an input received from the software components of radio module 7 to radio protocol stack 30. HCI 31 provides a serial interface between the software components of radio module 7.

Figure 5:
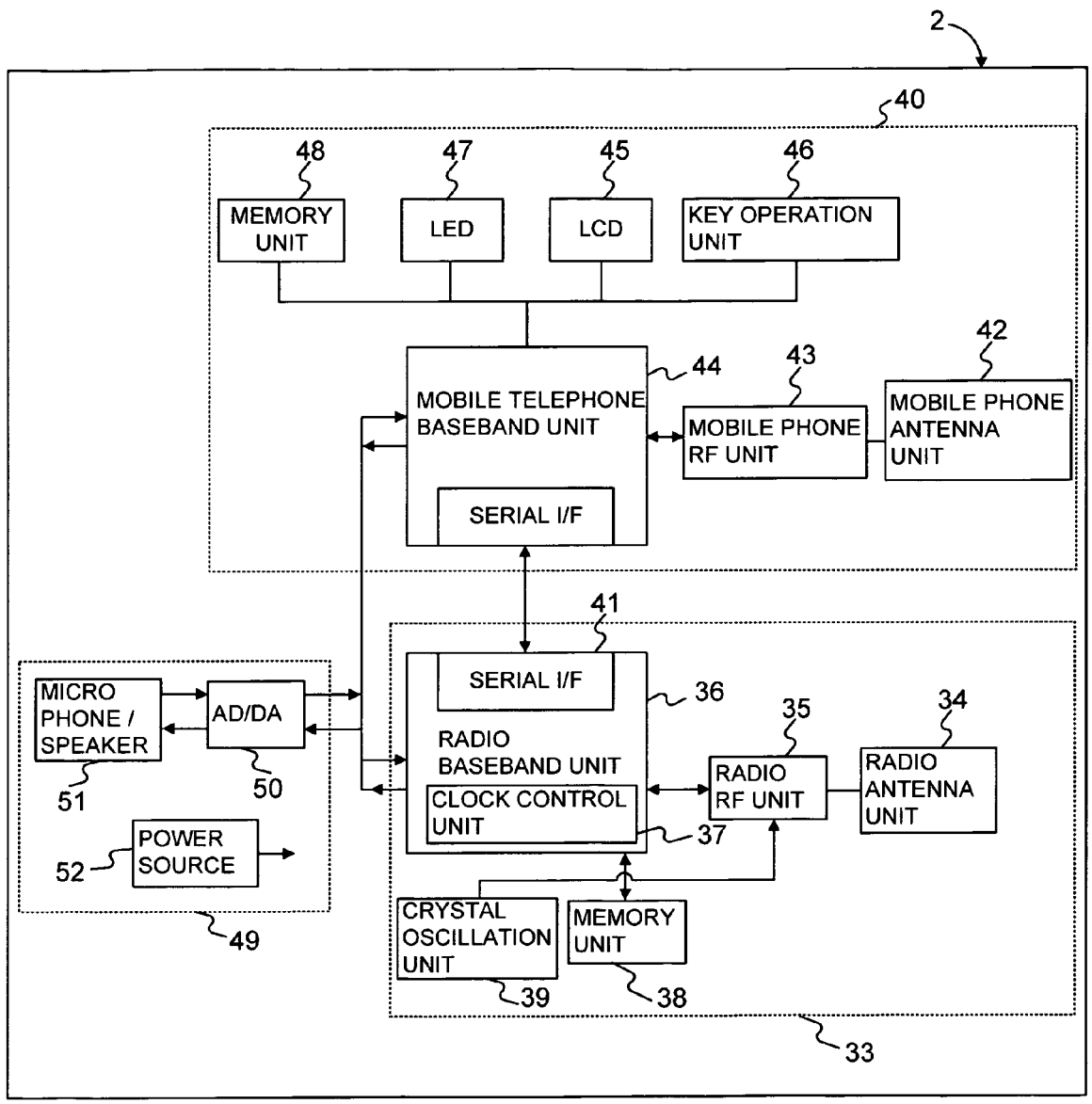
FIG. 5 is a block diagram illustrating a hardware structure of a mobile telephone consistent with the present invention.

FIG. 5 is a block diagram illustrating a hardware structure of mobile telephone 2 in accordance with an embodiment consistent with the present invention.

Mobile telephone 2 includes a radio module unit 33 having a radio antenna unit 34, an radio RF unit 35, a radio base band unit 36, which includes a clock control unit 37 and a serial interface 41, a memory unit 38, and a crystal oscillation unit 39. Mobile telephone 2 further includes a mobile phone engine part 40 having an antenna unit 42, an RE unit 43, a baseband unit 44 that includes a serial interface 520, an LCD 45, a key operation unit 46, an LED 47, and a memory unit 48. Mobile telephone unit 2 also includes a common unit 49 having an AD/DA conversion unit 50, a microphone/speaker unit 51, and a power source 52. Radio module unit 33 communicates with PC 1 over radio communication network 200 using a 2.45 GHz band radio wave. Mobile phone engine part 40 is connected to radio module unit 33 through a serial interface and serves as an interface to a user or other peripheral devices (not shown). Power unit 49 provides an audio interface and a power source for mobile telephone 2.

Radio antenna unit 34 is connected to radio communication network 200 through a radio link (not shown). Radio antenna unit 34 transmits and receives a 2.45 GHz radio wave between PC 1 over the radio link. Radio antenna unit 34 provides the received radio wave on its output to radio RF unit 35.

Radio RF unit 35 is connected to receive an input from radio antenna unit 34. Radio RF unit 35 is also connected to receive baseband signal input from crystal oscillation unit 39. Radio RF unit 35 modulates the received radio wave from radio antenna unit 34 with the baseband signal received from crystal oscillation unit 39, to convert the radio wave into an intermediate frequency signal. Following the conversion, radio RF unit 35 demodulates the intermediate signal to generate a digital signal. Radio RF unit 35 provides the digital signal on its output to radio baseband unit 36. Alternatively, when mobile telephone 2 desires to transmit a radio wave over radio communication network 200, radio RF unit 35 receives a digital signal from radio baseband unit 36. It should be understood that radio RF unit performs the reverse operations as described above, and provides a 2.45 GHz radio wave on its output to radio antenna unit 34.

Radio baseband unit 36 is connected to receive a digital signal output from radio RF unit 35. Radio baseband unit 36 is also connected to receive a signal output from memory unit 38. Furthermore, radio baseband unit 36 is connected to receive an input from power unit 49. Additionally, radio baseband unit 36 is connected to receive an input from engine unit 40. Radio baseband unit 36 includes a clock control unit 37 and a serial interface 41. When sending data through serial interface 41, radio baseband unit 36 converts the digital signal received from radio RF unit 35 into a data sequence so that a CPU (not shown) of mobile telephone engine unit 40 may process the data. Clock control unit 37 determines the timing for sending and receiving a data sequence over serial interface 41. On the other hand, radio baseband unit 36 provides the received digital data on its output to mobile telephone engine unit 40 and power unit 49. Alternatively, when mobile telephone unit 2 desires to transmit a radio wave over radio communication network 200, radio baseband unit 36 receives a data sequence from at least one of the power unit 49 or the mobile telephone engine unit 40. Radio baseband unit 36 performs the reverse of the operations described above, and provides a digital signal on its output to radio RF unit 35.

The components of mobile telephone engine unit 40 will now be discussed. Mobile phone antenna unit 42 communicates with mobile-phone base station 3. Mobile phone antenna transmits and receives information over an 800 MHz radio wave. Mobile phone antenna unit 42 provides the received 800 MHz radio wave on its output to mobile phone RF unit 43.

Mobile phone RF unit 43 is connected to receive the 800 MHz radio wave output from mobile phone antenna unit 42. Mobile phone antenna unit 43 demodulates the received radio wave to generate a digital signal. Mobile phone RF unit 43 provides the digital signal on its output to mobile telephone baseband unit 44. Alternatively, when mobile telephone unit 2 desires to transmit information to mobile-phone base station 3, mobile phone RF unit 43 receives a digital signal output from mobile telephone baseband unit 44. It should be understood that mobile phone RF unit 43 performs, in reverse order, the operations described above. Mobile phone RF unit 43 provides an 800 MHz radio wave on its output to mobile phone antenna unit 42.

Mobile telephone baseband unit 44 is connected to receive an input signal from radio module unit 33 and power unit 49. Mobile telephone baseband unit 44 is also connected to receive an input from key operation unit 46, LED 47, and memory unit 48. Mobile telephone baseband unit 44 controls the flow of information within mobile telephone engine unit 40. When mobile telephone unit 2 desires to send the information received by mobile telephone baseband unit 44 to mobile phone base station 3, mobile telephone baseband unit 44 will provide the received signal on its output to mobile phone RF unit 43. Alternatively, when the received information is targeted to a user, mobile telephone baseband unit 44 may provide the data to at least one of LED 47, LCD 45, radio module unit 33 through serial interface 520, and power unit 49.

LCD 45 is connected to receive an input from mobile telephone baseband unit 44. LCD 45 provides the received input signal on its output so that information can be displayed to a user.

Key operation unit 46 provides an interface for a user. Key operation unit 46 converts the user's input into a signal to provide on its output to mobile telephone baseband unit 44.

LED 47 is connected to receive an input from mobile telephone baseband unit 44, LCD 45, key operation unit 46, and memory unit 48. LED 319 is used to indicate warnings regarding the operation of mobile telephone unit 2.

Memory unit 48 is connected to receive an input from mobile telephone baseband unit 44. Memory unit 48 stores the received input until the mobile telephone baseband unit 44 requests the information.

Turning now to power unit 49, AD/DA conversion unit 50 is connected to receive an analog signal from microphone/speaker unit 51. AD/DA conversion unit 50 is also connected to receive a digital signal from radio module unit 33 and mobile telephone engine unit 40. AD/DA conversion unit 50 converts the received analog signal to a digital signal and provides the digital signal on its output to radio module unit 33 and mobile telephone engine unit 40. Alternatively, AD/DA conversion unit 50 converts the received digital signal to analog and provides the analog signal on its output to microphone/speaker unit 51.

Microphone/speaker unit 51 receives or outputs audio information. When receiving analog audio information, microphone/speaker unit 51 is connected to provide the received analog signal on its output to AD/DA conversion unit 50. When outputting audio information, microphone/speaker unit 51 is connected to receive an analog audio signal on its input from AD/DA conversion unit 50. Microphone/speaker unit 51 then outputs the received audio signal.

Power source 52 is mounted to provide a source of power for allowing mobile telephone 2 to perform the functions as discussed above.

Figure 6:
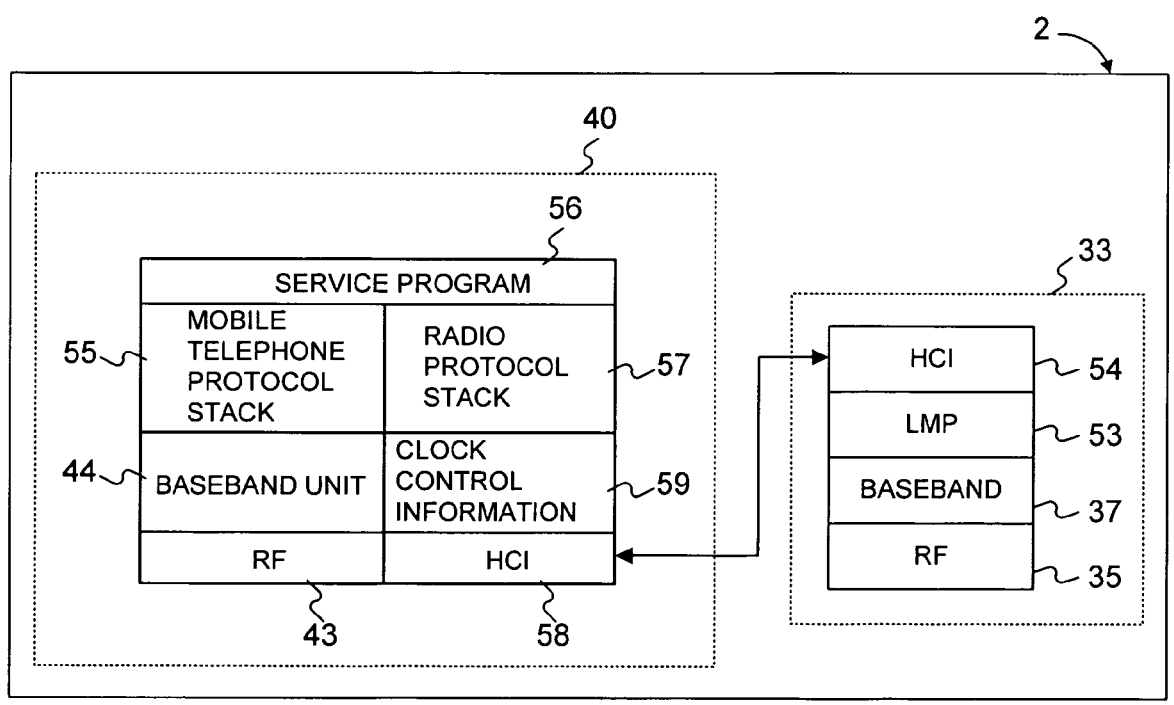
FIG. 6 is a block diagram illustrating a software structure of a mobile telephone consistent with the present invention.

FIG. 6 shows a block diagram illustrating a software configuration of mobile telephone 2 in accordance with an embodiment of the present invention. Mobile telephone 2 includes radio module 33 having software elements LMP 53 and HCI 54, and mobile phone engine part 40 having software elements mobile telephone protocol stack 55, service program 56, radio protocol stack 57, and clock control information 59.

LMP 53 is configured to monitor an output of baseband unit 37. LMP 53 controls a radio link between mobile telephone 2 and mobile phone base station 3 of radio communication network 200, by analyzing information communicated over an 800 MHz radio wave. Through the analysis, LMP 53 determines whether a radio link exists between mobile phone 2 and, for example, mobile phone base station 3. LMP 53 is further configured to provide results of this analysis to HCI 54.

HCI 54 is configured to receive an input from LMP 53. Alternatively, HCI 54 is also configured to provide an input received from the software components of mobile engine unit 40 to LMP 53. HCI 54 provides a serial interface between the software components of engine unit 40 and LMP 53.

Mobile telephone protocol stack 55 is configured to control communication over the 800 MHz frequency band by storing information received through HCI 54. Mobile telephone protocol stack 55 controls the flow of information between the service program 56 mounted on engine unit 40 and LMP 53 mounted on radio module 33. Clock control information 59 is configured to control the timing of all processes input or output from the radio protocol stack 59.

Service program 56 is configured to monitor or control specific functions or hardware components associated with engine unit 40.

Radio protocol stack 57 is configured to, control communication over the 2.45 GHz frequency band by storing information received through HCI 54. Radio protocol stack 57 controls the flow of information between the service program 56 mounted on engine unit 40 and LMP 53 mounted on radio module 33. Clock control information 59 is configured to control the timing of all processes input or output from the radio protocol stack 59.

HCI 58 is configured to receive an input from mobile telephone protocol stack 55 and radio protocol stack 57. Alternatively, HCI 58 is also configured to provide an input received from the software components of radio module 33 to mobile telephone protocol stack 55 or radio protocol stack 55. HCI 58 provides a serial interface between the software components of radio module 33 and either of mobile telephone protocol stack 55 and radio protocol stack 57.

The features of an embodiment consistent with the present invention that enables loading and unloading of service information processes are explained in detail below. In the discussion that follows it is assumed that Bluetooth is used as a radio-communications standard using a 2.45 GHz frequency band.

In the Bluetooth system, data transmission is achieved by a Time-Division Duplex (TDD) packet transmission of 625 microseconds per slot. Bluetooth uses a frequency hopping technique that changes a frequency for each transmitted packet. By using the same frequency hopping sequence, it becomes possible for one master to communicate with a maximum of seven slaves at the same time. A radio communication network configured in such a manner is known as a Piconet. Bluetooth further provides an asynchronous data channel (ACL: Asynchronous Connection Less) and a synchronous voice channel (SCO: Synchronous Connection Oriented) for data communications. The SCO can use up to three channels at once, each channel having a 64 Kbps channel throughput.

In Bluetooth, when a source terminal requests to communicate with a target terminal, but does not know an address of the target terminal, the source terminal performs an Inquiry for collecting information necessary to establish a connection. The Inquiry is also referred to as a station discovery. While performing the Inquiry, the source terminal may collect all device addresses and clock control information on all terminals that respond to the Inquiry. Because of the responses, the source terminal may establish a connection by executing a Page process (demand for connection establishment) based on the information collected from the responding terminals. Further, a remote terminal that is discovered by the source terminal performs an Inquiry Scan (waiting for station discovery) to answer the Inquiry message. Furthermore a remote terminal that is in a waiting state for a demand for connection establishment mode performs a Page Scan (waiting for a demand for connection establishment), to respond to the Page of the source terminal.

Figure 7:
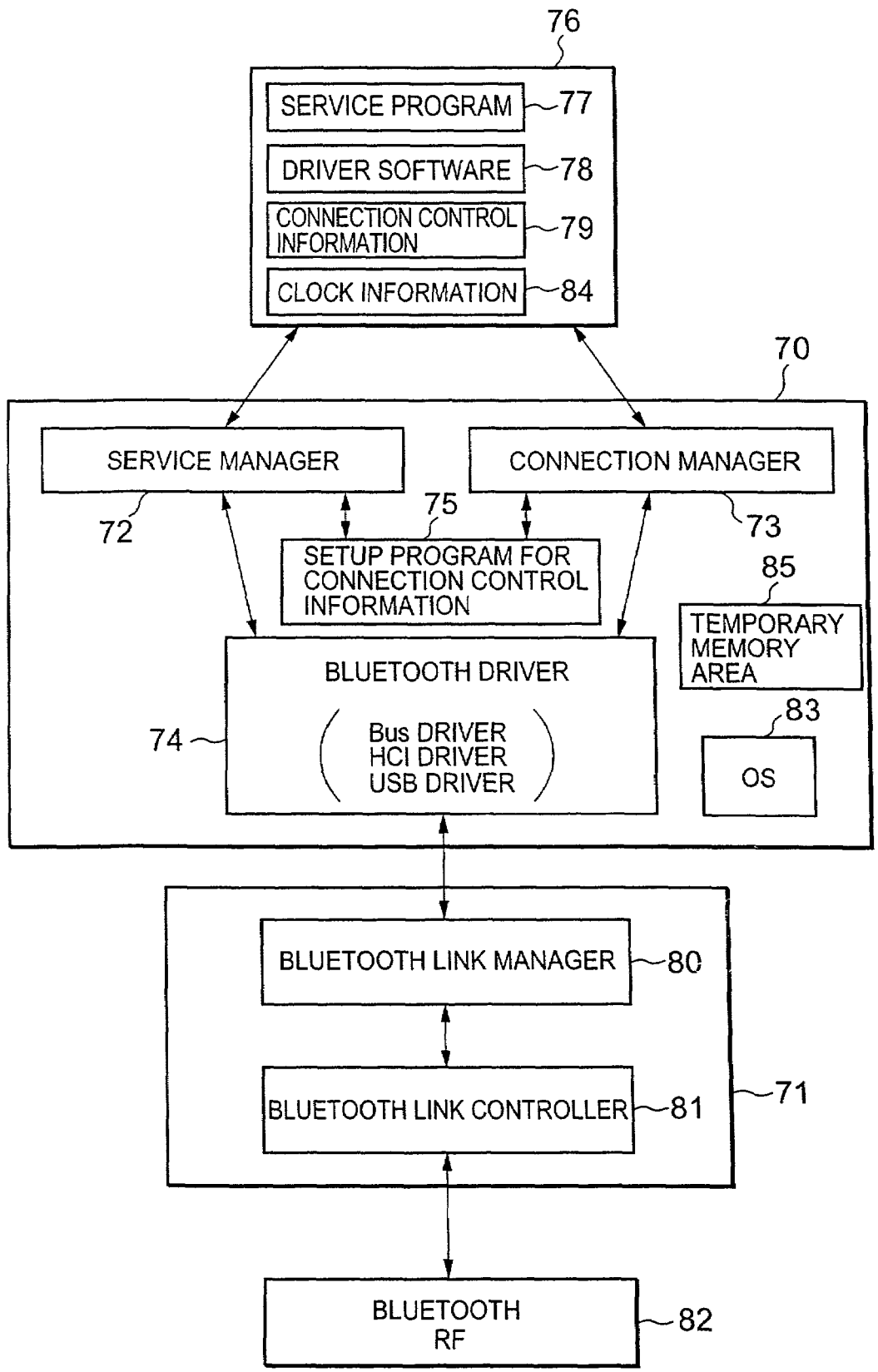
FIG. 7 is a block diagram illustrating a structure of a host and a host controller consistent with the present invention.

FIG. 7 illustrates a plurality of functional elements of PC 1 that enable the Bluetooth system to be mounted in accordance with an embodiment of the present invention. For illustrative purposes, we assume that PC 1 is a host device. PC 1 includes an information memory domain 76 having a service program 77, driver software 78, connection control information 79 and clock control information 84. PC 1 also includes a host 70 having a service manager 72, a connection manager 73, a Bluetooth driver 74, a setup program 75, an OS 83, and temporary memory 85. PC 1 further includes a host controller 71 having a Bluetooth link manager 80 and a Bluetooth link controller 81, and a Bluetooth RF circuit 82.

The host 70 and information memory domain 76 permanently reside at host PC 1. Host 70 and host controller 71 communicate in accordance with the protocol set forth by HCI 26 and 31. Bluetooth link manager 80 and Bluetooth link controller 81 control operations of the Bluetooth RF circuit 82. The Bluetooth device (non shown) is connected to PC 1 through USB 20.

Connection control information 79 defines detection conditions for a link connection state.

Clock control information 84 is used to determine when various operations should be executed.

Service manager 72 accesses information memory domain 76 to read stored service information, for example, service program 77 and driver software 78. Service manager 72 loads the service information read from service program 77 and driver software 78 to temporary memory 85 of host device 70. Service manager 72 may unload the service information from temporary memory area 85 as needed.

Connection manager 73 connects the temporary memory area 85 and the service information stored in a target device (not shown) so that service information can be communicated. Communication manager 73 monitors the connection state of a radio link based on communication control information 79.

FIG. 11 shows a chart illustrating the contents connection control information 79. Connection control information 79 includes a device address, a friendly name that is arbitrarily defined by a user to identify a device, connection judging conditions, and disconnection judging conditions. Connection judging conditions define conditions for determining whether a host device establishes a radio link with a target device. The connection conditions include a number of times (N) the same device issues Inquiry, an issue interval (Ti) of Inquiry, and a number-of-times maintenance time (Tn=N× Ti) expires before a response is detected, which is based on the Inquiry issue number-of-times (N) and the Inquiry issue interval (Ti). Specifically, service manager 72 loads service information when a response is detected before the predetermined number of times device detection is performed (i.e., after the number-of-times the maintenance time (Tn) ms has expired). If the loading time is shorter than the detected number-of-times the maintenance time (Tn) expires, then the loading process is determined to be unnecessary and is omitted. Host PC 1 determines that there is a low possibility for communication of the service information by establishing a radio link.

The disconnection judging conditions are conditions for determining whether host PC 1 disconnects a radio link with a target device. The disconnection judging conditions include a number-of-times (M) a connection request for recovering the connection is issued after host PC 1 detects a disconnection of a radio link, an issue interval (Tj) of the connection request, and a number-of-times the maintenance time (Tm=M×Tj) expires before a response is detected, which is based on the number-of-times (M) a connection request is made and the connection request issue interval (Tj). Thus, even if host PC 1 disconnects a radio link once, it is possible for host PC 1 to re-establish a connection with the radio link when a response to a connection request is received within a predetermined number of times before the maintenance time expires. PC 1 may, therefore, restrain the number of times service information is loaded because of an unnecessary radio link disconnection.

Figure 8:
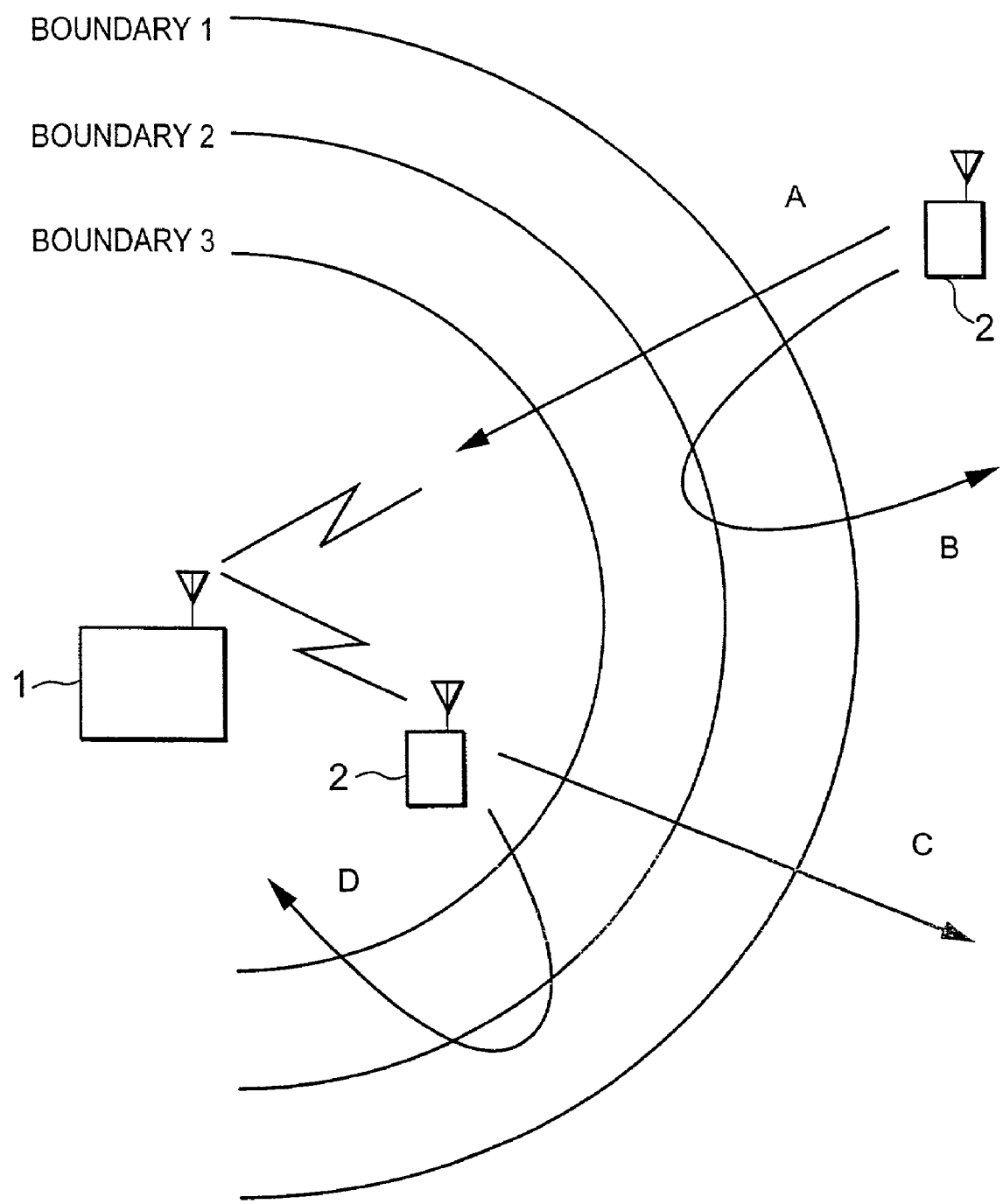
FIG. 8 is a block diagram illustrating a connection/disconnection state of a radio link consistent with the present invention.

FIG. 8 explains a connection/disconnection state of a radio link between PC 1 and a mobile telephone 2 on network 200 using Bluetooth technology. In FIG. 8, a boundary 2 designates a range limit of radio waves transmitted from the PC 1. A boundary 1 designates an area outside of the range limit of radio waves transmitted by PC 1. A boundary 3 designates an area inside of the range limit of radio waves transmitted by PC 1.

In a first example, it is assumed that mobile telephone 2 is initially located in an area outside of boundary 1.

When the mobile telephone 2 is located in a location outside of the boundary 2, a radio link between PC 1 and mobile telephone 2 is not established because mobile telephone 2 is unable to answer a device detection (Inquiry) broadcast by PC 1 over radio communication network 200. Assuming, mobile telephone 2 moves along locus A when mobile telephone 2 crosses boundary 2, mobile telephone 2 responds to the device detection (Inquiry). After receiving the response from mobile telephone 2, PC 1 begins a connection judging process of the radio link. If the PC 1 detects that the responses corresponding to each Inquiry occurs N number of times within a detection maintenance time (Ti) ms, then PC 1 loads service information, and further communicates with mobile telephone 2.

An analysis of the radio link will now be made assuming that mobile telephone 2 moves along a locus B. As shown in FIG. 8, when traveling along locus B mobile telephone 2 initially moves toward PC 1, but reverses direction so that it moves in a direction away from PC 1. As previously stated, mobile telephone 2 cannot establish a radio link when it is located outside of boundary 2, because PC 1 cannot receive a response to the device detection (Inquiry). However, PC 1 receives a response to the device detection (Inquiry) from mobile telephone 2 and establishes a radio link, when mobile telephone 2 moves in a direction towards PC 1 and crosses boundary 2. As a result, PC 1 begins a judging process to determine the connection state of the radio link. However, as shown in locus B, while PC 1 judges the radio link, mobile telephone 2 suddenly changes directions and moves away from PC 1, until it is located outside of boundary 2. Because mobile telephone 2 cannot respond to the device detection of PC 1, when a predetermined number of responses to the device detection have not occurred within a specified time, PC 1 determines that connection conditions do not exist. Therefore, PC 1 does not perform a loading process of service information.

In contrast, under the conventional process, when a mobile telephone 2 moves into a location within boundary 2, PC 1 begins loading service information. Moreover, when mobile telephone 2 moves to a location outside of boundary 2, PC 1 immediately unloads service information. As a result, PC 1 performs unnecessary loading and unloading of service information. PC 1 also performs excessive communications with mobile telephone 2. From the above discussion it is apparent that the conventional process decreases communication performance.

In a second example, it is assumed that mobile telephone 2 is initially located inside of boundary 3.

Initially, PC 1 establishes a radio link with mobile telephone 2 because mobile telephone 2 is in a location within boundary 2. Assuming, now that mobile telephone 2 moves along a locus C, in a direction away from PC 1, when mobile telephone 2 crosses boundary 2, PC 1 detects a disconnection of the radio link. As a result, PC 1 transmits a connection request to the mobile telephone 2, indicating that the radio link is disconnected. PC 1 monitors radio communication network 200, to determine whether N responses are detected within a maintenance time (Tm) ms. However, because mobile telephone 2 is located outside of boundary 2, PC 1 does not receive N response within the maintenance time. Thus PC 1 disconnects the radio link. At the same time PC 1 disconnects the radio link, service manager 72 of PC 1 unloads the service information. Before disconnection of the radio link, PC 1 and mobile telephone 2 communicated the service information over radio network 200.

An analysis of the state of the radio link between PC 1 and mobile telephone 2 will now be made assuming that mobile telephone 2 travels in a direction shown by locus D. Initially, because mobile telephone 2 is located within boundary 2, PC 1 establishes a radio link with mobile telephone 2. When the mobile telephone 2 moves in a direction away from PC 1 to a location outside of boundary 2, PC 1 detects a disconnection of the radio link. As a result, PC 1 transmits a connection request to mobile telephone 2, indicating that the radio link is disconnected. PC 1 monitors radio network 200 for response from mobile telephone 2 to determine whether N responses are detected within a predetermined maintenance time (Tm) ms. If, however, mobile telephone 2 moves in a direction towards PC 1 to a location within boundary 2, mobile telephone 2 responds to the connection request of PC 1. Because PC 1 detects a response within the predetermined maintenance time, PC 1 maintains the radio link.

Figure 9:
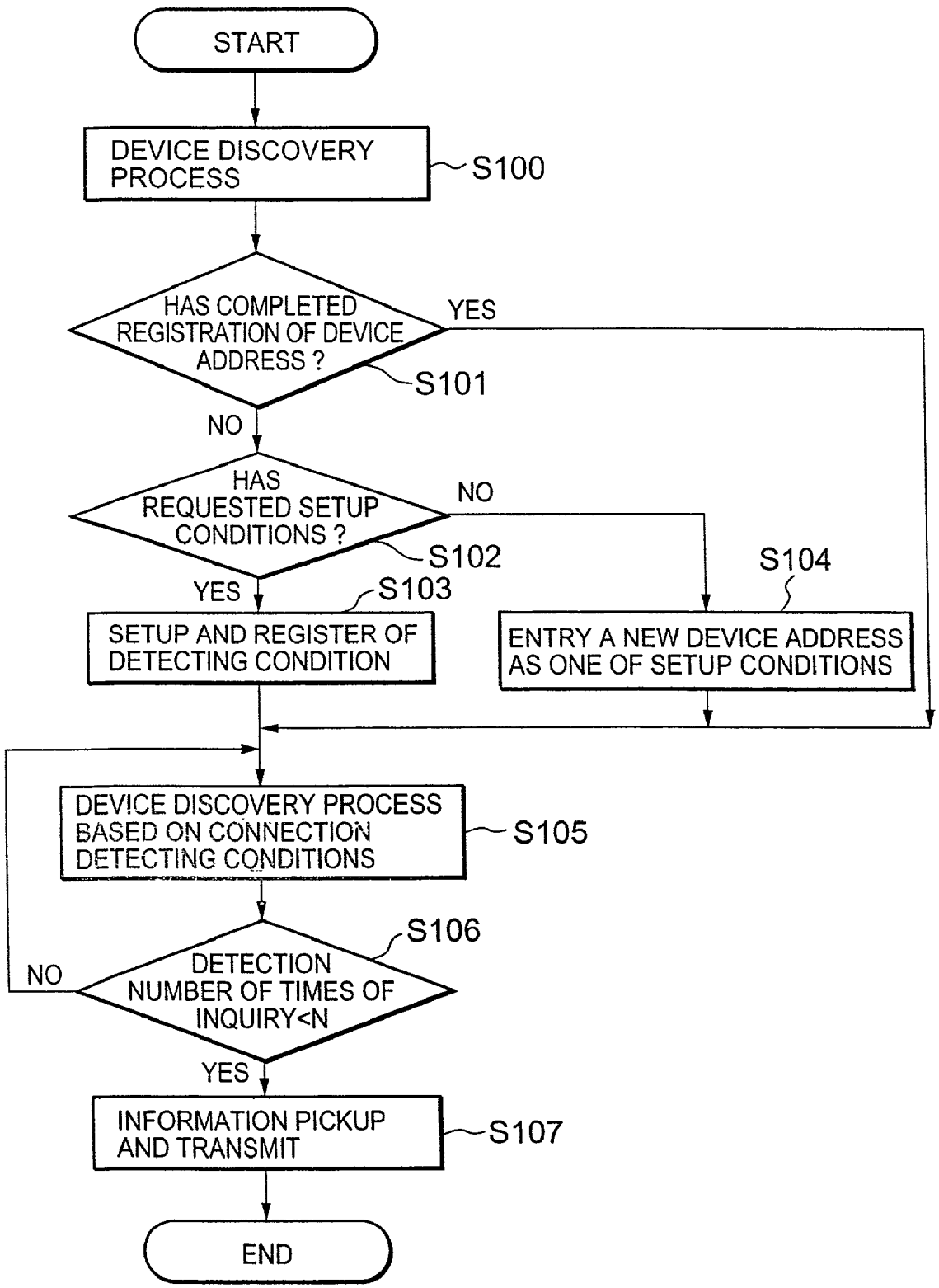
FIG. 9 is a flowchart showing a connection judging process of radio link consistent with the present invention.
Figure 10:
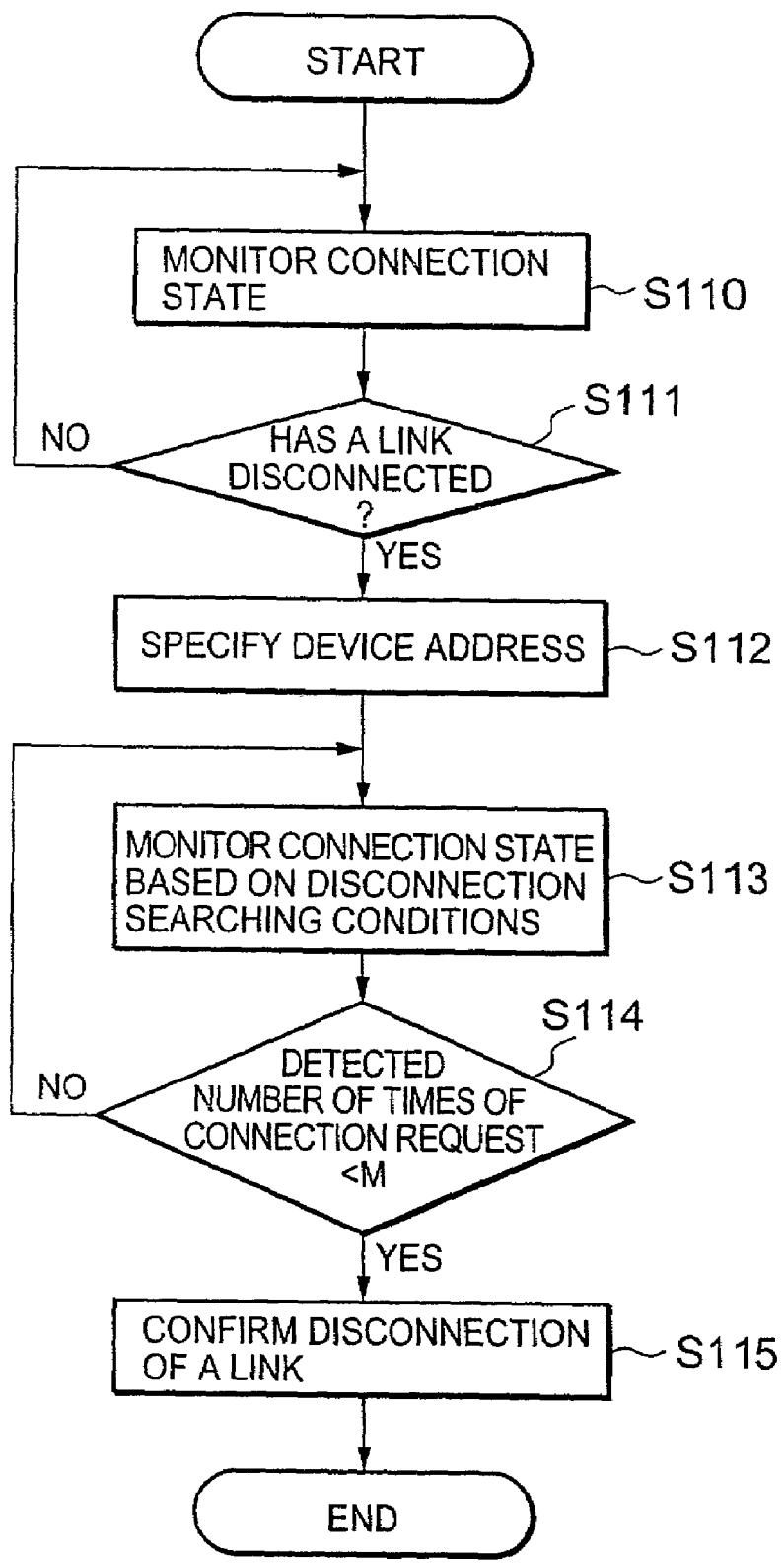
FIG. 10 is a flowchart showing a disconnection judging process of a radio link consistent with the present invention.

FIGS. 9 and 10 show a flow diagram illustrating the connection judging process and disconnection judging process, respectively, in a manner consistent with the present invention.

During the connection judging process shown in the flow chart of FIG. 9, service manager 72 of PC 1 sends an HCI command to host controller 71. Service manager 72 further performs an Inquiry so that a device may be discovered on network 200. Service manager 72 acquires a device address, clock control information, and service demand information from a target device on network 200 (S100). PC 1 then determines whether the detected target device address is registered into connection control information 79 of information memory domain 76 (S101). If, PC 1 determines that the detected target device address is not registered in connection control information 79, then the connection judging process moves to S102. On the other hand, if PC 1 determines that the detected device address is registered in connection control information 79, then the connection judging process moves to S105.

At S102, because the connection control information corresponding to the detected target device address is not registered, PC 1 asks a user whether connection conditions and disconnection conditions are required to be setup and registered. If a user answers "yes," PC 1 performs an appropriate setup/registration processes (S103). If a user answers "no," then PC 1 does not perform the setup process (S104) and default connection/disconnection conditions of network 200 are associated with the detected target device and copied into connection control information 79. This process is performed so that the newly detected target device address is associated with at least standard connection conditions.

The process step performed at S103, is explained in further detail in FIG. 12. FIG. 12 illustrates an example of a condition set-up screen as displayed on LCD 21 of PC 1. Keyboard 22 enables a user to input the necessary data. A user may optionally input a friendly name of the device as an entry in the condition setup object. A user may indicate connection detecting condition set-up items including a number of times (N) an Inquiry should issue, an issue interval (Ti), and a detection number for the maintenance time (Tn). A user may also indicate disconnection detecting conditions setup items including a number-of-times a connection request should issue request (M), an issue interval (Tj), and a detection number for a maintenance time (Tm).

Furthermore, the condition set-up screen enables a user to indicate an inquiry detection mode, which allows the connection request inquiry detection interval to be fixed or variable. In Bluetooth, a user may also dynamically vary an issue interval of the inquiry or connection request. When a user sets a variable inquiry detection mode, thereby giving priority to the detection number of the maintenance time of detection number-of-times, a host device may connect or disconnect a radio link even when the number of issued inquiries fails to meet the predetermined level. Moreover, a user may give priority to the inquiry detection mode or the connection request detection mode by selecting a fixed state. When a user completes the condition setup, a "Registration"

button may be selected so that an address may be assigned to the previously detected target device. Furthermore, selecting the "Registration" button saves the condition setup information in connection control information 79. If a user selects a "Cancellation" button, then processing is terminated without saving the contents of the condition set up screen. It is further possible to change the setup items of any devices by selecting a triangle mark in the right column of the condition setup object field. This enables a user to select a detection device from a list of friendly names registered to each respective device in connection control information 79.

Returning now to FIG. 9, at S105 the connection judging conditions based on the detected device address are read from connection control information 79, and the device discovery process continues based on the read conditions (S105). At step S106, the host device detects whether the number of times of inquiry is less than N. When the number of times of Inquiry detection is not less than N, the process returns to S105. Alternatively, when the number of times of Inquiry detection is less than N, processing progresses to S107. At S107, the host loads information from service program 77 or driver software 78 in information memory area 76 that corresponds to the service information demanded from the detected device to temporary memory area 85. As a result, the host device may communicate with the detected device side. By performing the above process, PC 1 prevents the unexpected loading of service information when a mobile telephone 2 enters a communication area of PC 1. Furthermore, PC 1 avoids an increase in communication loads with mobile telephone 2.

FIG. 10 shows a flow chart illustration of the disconnection judging process. Connection manager 73 of PC 1 monitors the connection state of a radio link with a mobile telephone 2, based on a notice from Bluetooth driver 74 (S110). Connection manager 73 determines whether the radio link has disconnected (S111). When the radio link has disconnected, connection manager returns to S110 in order to continue monitoring the connection state of the radio link. If radio link disconnection is detected, however, connection manager 73 progresses to S112. At S112, service manger 72 identifies a device address for the disconnected link (S112), and connection manager 73 monitors a radio link connection state by reading out the disconnection judging conditions in connection control information 79 associated with the device address (S113). When the number of detected connection requests is less than M, connection manager 73 returns to S113 in order to continue monitoring the connection state of the radio link. When the number becomes M times, the process progresses to a step S114. When the number of detected connection requests is not less than M, connection manager 73 confirms disconnection of the radio link, because no response was received from a target device. Service manager 72 unloads service information from temporary memory area 85(S115). By performing this control, PC 1 avoids unnecessary loading or unloading of operations of the service information, because connection manager 73 maintains a radio link connection if mobile telephone 2 sends a response within a predetermined time period. As shown in FIG. 8, even if, after the radio link is established, mobile telephone 2 temporarily moves outside of a communication range of the PC 1, connection manager 73 will maintain a radio link connection if mobile telephone 2 sends a response within a predetermined time period. Thus, PC 1 also avoids an increase of processor loads and can further avoid an increase of radio-communications load with a mobile telephone 2.

As explained above, embodiments consistent with the present invention enable a user to flexibly setup the connection or disconnection judgment conditions of the radio link state. As a result, it is possible to increase communications processing performance without increasing the processing load of the host device or the communication load due to a target device.

In the above embodiment, the connection condition and disconnection condition of the radio link state was determined based on the number of times of Inquiry and the number of times a connection request are issued within a predetermined time. However, it is also possible to determine a radio link state based on an intensity of a radio wave. For example, in an embodiment of the present invention, a user may setup a power level of the radio wave. In other words, by gradually changing the power level of the radio wave, a user may define the detection range of PC 1 by the boundaries 1, 2, and 3, as shown in FIG. 8. Here, the radio wave detection range of the standard power level 2 is limited to boundary 2.

When mobile telephone 2 approaches PC 1 in a direction defined by locus A, if PC 1 performs device detection at each stage from a boundary 1 (power level 1) to a boundary 3 (power level 3), PC 1 loads the service information by determining whether mobile telephone 2 desires to establish a radio link connection to PC 1. On the other hand, when PC 1 does not detect a device between boundary 1 (power level 1) and boundary 2 (power level 2), as shown by the direction traveled along locus B, PC 1 does not load the service information by determining that mobile telephone 2 has only temporarily came near to PC 1.

In another example, when mobile telephone 2 travels in a direction away from PC 1 as shown by locus C, PC 1 determines that the mobile telephone 2 has intentionally separated from PC 1. As a result, PC 1 disconnects the radio link. Moreover, service manager 72 unloads the service information from temporary memory area 85. When mobile telephone unit 2 travels in a direction away from PC 1 to a location outside of boundary 2 (locus D), PC 1 determines that the mobile telephone 2 temporarily separated from PC 1. As a result, PC 1 does not disconnect the radio link.

Although an embodiment has been disclosed that includes the loading/unloading control of service information as it relates to PC 1, it should be apparent that this process might also be applied to mobile telephone 2. Moreover, it should be understood that this process is not limited to devices such as PC 1 and mobile telephone 2. But the loading/unloading control of service information consistent with the present invention may be applied to various other electrical devices having a radio resource that is exclusively used between a communication channel and where a connection is controlled by inserting a communication channel into a control channel for the devices.

As explained above, embodiments consistent with the present invention can prevent unnecessary loading and unloading of service information processes because it is possible to flexibly set up the connection judgment conditions and disconnection judgment conditions of the host device as they relate to the radio link. As a result, communication-processing performance is improved without increasing the processing load of the host device or the communication load of host device with regards to a target device.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A communication device, comprising:
a radio communication module configured to exchange data with a target communication terminal over a network;
a service information memory configured to store service information so that predetermined functions can be performed with the target communication terminal;
a communication control information designating module configured to designate, by a user of the communication device, communication conditions for a newly established radio communication connection with the target communication terminal or for discriminating a disconnection of an existing radio communication connection with the target communication terminal;
a memory configured to store the communication conditions designated by the communication control information designating module; and
a communication control module configured to determine whether the radio communication connection with the target communication terminal is in a connection status or a disconnection status based on the communication controlling information stored in the memory, and performing communication through the radio communication module by using service information read from the service information memory in accordance with the determination result.

2. A communication device, comprising:
a radio communication module configured to exchange data with a target communication terminal through radio;
a service memory configured to store service information so that predetermined functions can be performed with the target communication terminal;
a temporary memory configured to temporarily store service information used in an established target communication terminal for communication;
a designating module configured to designate, through a registration interface, communication controlling information defining conditions for discriminating between a newly established radio communication connection with the target communication terminal or a disconnection of an existing radio communication connection with the target communication terminal;
a communication controlling information memory configured to store the communication controlling information designated by the designating module;
a memory configured to store the communication controlling information designated by the designating module;
a discriminating module configured to determine whether a status of the radio communication connection with a target communication terminal is a connection status or a disconnection status based on the communication controlling information in the communication controlling information memory, to transfer the service information from the service memory to the temporary memory when the status of the radio communication connection with the target communication terminal is the connection status, and to transfer the service information from the temporary memory to the service memory when the status of the radio communication connection with the target communication terminal is the disconnection status; and
a radio communication control module configured to perform the predetermined functions with the target communication terminal when the service information is stored in the temporary memory.

3. The communication device according to claim 1 or claim 2, wherein:
the communication controlling information includes connection discriminating conditions based on the number of times a detecting command for detecting the target communication terminal issues during a predetermined period and disconnection discriminating conditions based on the number of times a confirming command for confirming the connection to the target communication terminal issues during the predetermined period.

4. The communication device according to claim 1 or claim 2, wherein:
the communication controlling information includes connection and disconnection discriminating conditions that define a variation status of the radio communication connection for indicating a communication connection or a disconnection to the target communication terminal, the variation status is designated based on a power level of radio waves measured within a predetermined period.

5. A method for controlling a communication device that exchanges data with a target communication terminal over a network, the communication device having a memory for storing various types of data, the method comprising:
designating, by a user of the communication device, communication control information that defines discriminating conditions for discriminating between establishing a new radio communication connection between the communication device and a target communication terminal and disconnecting a radio communication connection established between the communication device and the target communication terminal;
storing, in the memory, the designated communication control information;
judging whether the radio communication connection between the communication device and the target communication terminal is in a connection state or a disconnection state based on the designated communication control information; and
performing radio communication with the target communication terminal by using service information that executes predetermined functions between the communication device and the target communication terminal, the service information being stored in memory based on a discrimination result.

* * * * *